(12) United States Patent
Shibata et al.

(10) Patent No.: US 10,254,900 B2
(45) Date of Patent: Apr. 9, 2019

(54) DRIFTING KEYBOARD

(71) Applicant: Tufts University, Medford, MA (US)

(72) Inventors: Tomoki Shibata, Takahagi (JP); Robert J. K. Jacob, Lexington, MA (US); Daniel Afergan, San Francisco, CA (US); Danielle Kong, Tenafly, NJ (US)

(73) Assignee: Tufts University, Ballou Hall, Medford, MA (US)

( * ) Notice: Subject to any disclaimer, the term of this patent is extended or adjusted under 35 U.S.C. 154(b) by 31 days.

(21) Appl. No.: 15/046,584

(22) Filed: Feb. 18, 2016

(65) Prior Publication Data
US 2017/0242550 A1    Aug. 24, 2017

(51) Int. Cl.
| | |
|---|---|
| *G06F 3/042* | (2006.01) |
| *G06F 3/0488* | (2013.01) |
| *G06F 3/023* | (2006.01) |
| *G06F 3/041* | (2006.01) |
| *G06F 3/01* | (2006.01) |
| G06F 3/0481 | (2013.01) |
| G06F 3/0489 | (2013.01) |

(52) U.S. Cl.
CPC ............ *G06F 3/0426* (2013.01); *G06F 3/017* (2013.01); *G06F 3/023* (2013.01); *G06F 3/0233* (2013.01); *G06F 3/041* (2013.01); *G06F 3/0488* (2013.01); *G06F 3/04883* (2013.01); *G06F 3/04886* (2013.01); *G06F 3/0489* (2013.01); *G06F 3/04812* (2013.01)

(58) Field of Classification Search
CPC .. G06F 3/04886; G06F 3/04883; G06F 3/017; G06F 3/0488; G06F 3/0482; G06F 3/0233; G06F 3/041; G06F 3/0489; G06F 3/04842; G06F 3/03547; G06F 3/023; G06F 1/1626; G06F 1/1673
See application file for complete search history.

(56) References Cited

U.S. PATENT DOCUMENTS

| | | | | |
|---|---|---|---|---|
| 8,525,792 | B1 * | 9/2013 | Lee ..................... | G06F 3/04886 345/168 |
| 8,547,354 | B2 * | 10/2013 | Koch .................. | G06F 3/04886 178/18.01 |
| 9,176,659 | B2 * | 11/2015 | Park ..................... | G06F 3/04886 |
| 9,201,509 | B2 * | 12/2015 | Yang ...................... | G06F 3/005 |
| 9,959,039 | B2 * | 5/2018 | Artigue ............... | G06F 3/04886 |
| 2007/0296704 | A1 * | 12/2007 | Park ...................... | G06F 3/0362 345/169 |
| 2008/0284744 | A1 * | 11/2008 | Park ...................... | G06F 3/0486 345/173 |
| 2009/0109184 | A1 * | 4/2009 | Kim .................... | G06F 3/04815 345/173 |

(Continued)

OTHER PUBLICATIONS

Chen et al., "Swipeboard: A Text Entry Technique for Ultra-Small Interfaces that Supports Novice to Expert Transitions," UIST'14, Oct. 5-8, 2014, pp. 615-620.

(Continued)

*Primary Examiner* — Dismery Mercedes
(74) *Attorney, Agent, or Firm* — Occhiuti & Rohlicek LLP

(57) ABSTRACT

A keyboard entry system for use in a touch screen display in which a user touches the display to move a keyboard on the display. The user moves the keyboard until a desired key lies under a fixed cursor. To type the key, the user lifts his finger.

19 Claims, 5 Drawing Sheets

(56) References Cited

U.S. PATENT DOCUMENTS

| | | | | |
|---|---|---|---|---|
| 2010/0097321 A1* | 4/2010 | Son | G06F 3/04886 | 345/169 |
| 2011/0258565 A1* | 10/2011 | Arscott | G06F 3/0416 | 715/763 |
| 2011/0285651 A1* | 11/2011 | Temple | G06F 3/0237 | 345/173 |
| 2012/0011462 A1* | 1/2012 | Westerman | G06F 3/0416 | 715/773 |
| 2012/0117506 A1* | 5/2012 | Koch | G06F 3/04886 | 715/773 |
| 2012/0206363 A1* | 8/2012 | Kyprianou | G06F 3/04886 | 345/168 |
| 2012/0206370 A1* | 8/2012 | Ivanovic | G06F 3/04886 | 345/173 |
| 2013/0169540 A1* | 7/2013 | Dinh | G06F 3/0233 | 345/168 |
| 2013/0187868 A1* | 7/2013 | Griffin | G06F 3/04886 | 345/173 |
| 2013/0241837 A1* | 9/2013 | Oga | G06F 3/04886 | 345/168 |
| 2013/0268883 A1* | 10/2013 | Kim | G06F 3/0485 | 715/784 |
| 2013/0285926 A1* | 10/2013 | Griffin | G06F 3/04883 | 345/173 |
| 2013/0326428 A1* | 12/2013 | Liu | G06F 3/04812 | 715/856 |
| 2015/0089431 A1* | 3/2015 | Ji | G06F 3/04886 | 715/773 |
| 2015/0160842 A1* | 6/2015 | Yabuki | G06F 3/04845 | 715/773 |
| 2015/0370402 A1* | 12/2015 | Checkley | H04N 21/41407 | 345/173 |
| 2016/0070441 A1* | 3/2016 | Paek | G06F 3/04842 | 715/773 |
| 2016/0124633 A1* | 5/2016 | Kim | G06F 1/1643 | 715/773 |
| 2017/0003837 A1* | 1/2017 | Shamonsky | G06F 3/04886 | |
| 2017/0068448 A1* | 3/2017 | Ghassabian | G06F 3/04886 | |
| 2017/0097689 A1* | 4/2017 | Miller | G06F 1/1624 | |
| 2017/0102871 A1* | 4/2017 | Won | G06F 3/0481 | |
| 2017/0109039 A1* | 4/2017 | Lemay | G06F 3/04886 | |

OTHER PUBLICATIONS

Kwon et al., "Drag-and-Type: A New Method for Typing with Virtual Keyboards on Small Touchscreens," IEEE Transactions on Consumer Electronics, vol. 60, No. 1, Feb. 14, 2014, pp. 99-106.

Sukswai et al., "Cursorkeyboard: An Input Method for Small Touch Screen Devices," 2012 Ninth International Joint Conference on Computer Science and Software Engineering (JCSSE), pp. 271-275.

* cited by examiner

DRIFTING KEYBOARD

FIELD OF INVENTION

This invention relates to data entry devices, and in particular, to data entry on a small touch screen.

BACKGROUND

A difficulty that arose in the early days of personal computers was that of communicating instructions to the computer. Among the most successful ideas for solving this problem was that of inviting a user to point to a selection using a mouse-driven pointer. The selection could be words, such as those on a menu. Or it could be an icon on a desktop. In either case, the central idea was that a pointer selected and activated a particular command.

Touch screens made it possible to dispense with the mouse. With a touch screen, one could simply touch the selection directly. However, the fundamental idea was the same. One would touch what one wanted to select. The main difference was that one could now touch it directly.

The idea of touch screens led naturally to that of virtual keyboards. To enter a letter, the user would touch the appropriate key. The principle was thus the same as it always had been. To cause a result, one would select an appropriate symbol on a display.

This procedure works best when the screen is large enough so that the key can be made commensurate in size with the finger. When the screen becomes smaller, the keys become so small that a human finger can no longer reliably touch the correct key.

An obvious solution would be to use a finger prosthesis, such as a sharp instrument. However, this is inconvenient. Another known solution is that of simply dictating one's selection. However, voice recognition is sometimes unreliable and unsuitable for noisy environments. It is also unsuitable for quiet environments in which many people are present.

SUMMARY

An object of the invention is that of enabling one to reliably type on even a very small keyboard. The invention is based on the recognition that even though a finger has low spatial resolution because of its size, it is nevertheless able to move by small amounts with considerable precision of movement. The invention harnesses this ability to bypass the inherently low spatial resolution of a human finger.

According to the invention, it is not necessary to actually touch what it is that one wants to select. The invention thus upends the existing paradigm of selection. It provides a method of using a touch screen without actually touching what it is that one wishes to select.

Instead, the invention permits one to select by dragging the display of a touch screen so that the object to be selected lies under a fixed cursor. The fixed cursor can be made much smaller than the resolution of a human finger.

In one aspect, the invention features a manufacture comprising a tangible and non-transitory computer-readable medium having encoded thereon instructions for causing a device to execute software comprising a set of instructions for enabling a user to make a selection from a virtual keyboard that is shown on a display. Such instructions include instructions for defining a virtual keyboard that has keys, each of which corresponds to a character from a character set, with first and second subsets of those keys in corresponding first and second zones of the keyboard. The instructions also include instructions for causing relative motion between the virtual keyboard and the display in response to a gesture by a user on the display. Such a gesture begins with a beginning, ends with an ending, and consists of a middle section between the beginning and the ending, wherein the middle section ends upon occurrence of the ending. During the middle section, a user contacts the display to trace a continuous path on the display, all the while maintaining continuous contact with the display. As the middle section of this gesture executes, the first zone transitions between a first state, in which it is fully visible, and a second state, in which at least a portion of it is rendered invisible. The instructions also include instructions for displaying the first zone of the virtual keyboard, for displaying a selection cursor at a fixed location on a touch-screen display of the device, and for responding to the user executing the middle section of the gesture by causing the first zone to transition from the first state to the second state, instructions for causing a first key from the virtual keyboard, which corresponds to a first character, to move to the cursor as a result of the user having executed the middle section, and instructions for generating data indicative of a selection of the first character by the user in response to detection of an ending of the gesture by the user.

In some embodiments, the instructions for generating data indicative of the selection of the first character are carried out in response to detecting cessation of contact between the user and the display. Such cessation occurs, for example, upon lifting a finger or other object off the display.

In other embodiments, the software is configured to detect an event indicative of the beginning of the gesture and an event indicative of the ending of the gesture, wherein the event indicative of the beginning comprises onset of contact between a user and the display, and wherein an event indicative of the ending comprises interruption or cessation of contact between the user and the display.

Embodiments also include those in which the first key is in the first zone and those in which the first key is in the second zone.

Also among the embodiments are those in which the display imposes on the path traced during the middle section of the gesture a maximum physical displacement. In these embodiments, the software also has instructions for responding to tracing of the path by causing relative motion between the display and the virtual keyboard to an extent that is sufficient to ensure that all keys on the virtual keyboard can be moved to the cursor within a middle section that is less than or equal to the maximum physical displacement. Among these are embodiments in which there are instructions for determining the extent based on a location of a zone relative to the display, wherein the zone is selected from the group consisting of the first zone and the second zone.

Yet other embodiments include instructions such that during the middle section, the second zone transitions between a first state, in which the second zone is fully invisible, and a second state, in which at least a portion of the second zone is rendered visible.

Also among the embodiments are those that have instructions for setting a position of the cursor on the display and those that have instructions for causing insertion of a space when a space is under the cursor upon occurrence of the ending.

Embodiments include various relationships between the sizes of the keyboard and the display. In some embodiments, instructions define a keyboard that is larger than the display. In others, instructions define a keyboard that is smaller than the display.

Also among the embodiments are those in which the instructions for defining the virtual keyboard define keyboards having a plurality of key sets that are separate from each other. These key sets move as a unit during the execution of the middle section.

Additional embodiments include a device having a touch screen so that the display is on the touch screen. Examples of such embodiments are those that include a watch, where the touch screen is part of the watch, and those that include a digital computing device, where the touch screen is part of the digital computing device.

The claims are specifically limited to those embodiments that are within the ambit of 35 USC 101 as of the filing date of this application. To the extent claims are deemed to cover embodiments that are outside the ambit of 35 USC 101, those embodiments are specifically disclaimed. To the extent the claims are deemed to cover embodiments that are no more than software per se, those embodiments are specifically excluded from the claims. All embodiments covered by the claims are made of tangible matter that has mass. To the extent the claims are construed to cover embodiments that are not made of matter and that do not have mass, those embodiments are specifically disclaimed from claim scope.

DETAILED DESCRIPTION

Figure 1:
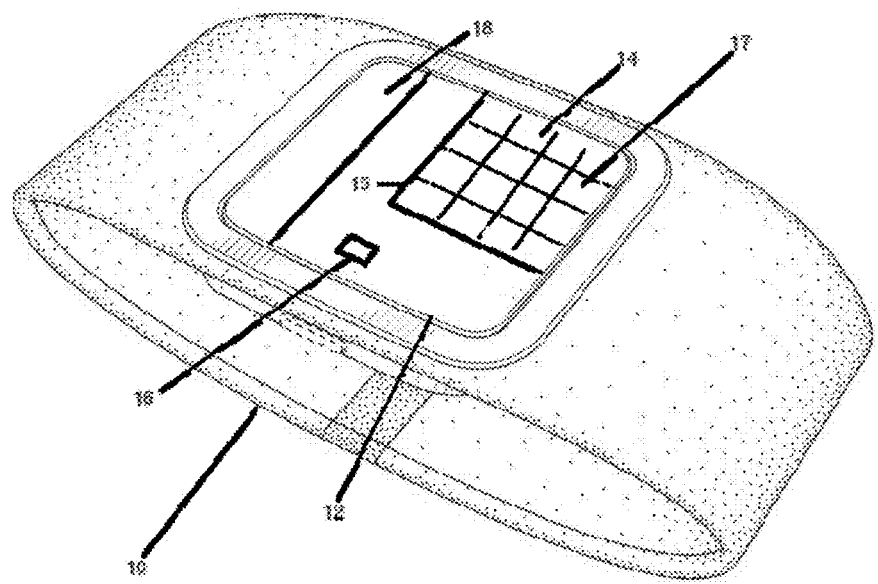
FIG. 1 shows a watch having a virtual keyboard on a display thereof.

FIG. 1 shows a watch 10 having a touch-screen display 12. When necessary, the display 12 invites text entry by providing a virtual keyboard 14. The user then moves this keyboard 14 relative to a fixed cursor 16 on the display 12. A visible frame 15 on the keyboard 14 defines a space having keys 17 disposed therein. Each key 17 maps to a particular character in a character set.

Because the virtual keyboard 14 moves relative to the display 12, there may be times during which a section of the virtual keyboard 14 cannot be seen in the display 12. This is particularly true in cases where the display 12 is relatively small and the keyboard 14 fills a sizable fraction of the display 12. However, in some embodiments, the display 12 is sufficiently large compared to the keyboard 14 so that the keyboard 14 is visible in its entirety and remains within the confines of the display 12 at all times.

A suitable gesture by the user, such as a panning gesture, will bring previously invisible portions of the keyboard 14 into view while causing formerly visible portions to become invisible. The display 12 can thus be viewed as a window that pans across the keyboard 14 in response to user gestures.

As shown in FIG. 1, a portion of the display 12 defines a fixed cursor 16. This fixed cursor 16 is used to select a key 17 on the keyboard 14. The position of the fixed cursor 16 can be set to suit the needs of a user. For a right-handed user, a fixed cursor 16 on the left side has been found most convenient.

To enter a character, the user engages in a tripartite gesture. The tripart gesture consists of three sections: a beginning, a middle section, and an ending. To cause character entry, the user executes these three sections in the correct order without interruption.

In the beginning section, the user contacts the keyboard 14. Contact can occur, for example, by having the user land his finger on the keyboard 14, or by causing some other object, such as a stylus, to land on the keyboard 14.

In either case, the beginning section unmoors the keyboard 14 so that it can move relative to the display 12. The user then moves his finger along the display 12 in a direction that moves the keyboard 14, and with it, the desired key 17. The user continues this movement until the desired key 17 lies under the fixed cursor 16. This movement forms the middle section of tripartite gesture.

The ending section of the tripartite gesture occurs upon the user lifting his finger off the display 12. This is carried out when the desired key 17 is under the fixed cursor 16. Occurrence of this ending section causes the fixed cursor 16 to capture the character and place it in a text box 18, along with other characters that have been similarly captured.

FIGS. 2-6 show in detail the steps in typing the letter "i" into a text box 18 into which some text has already been typed.

Figure 2:
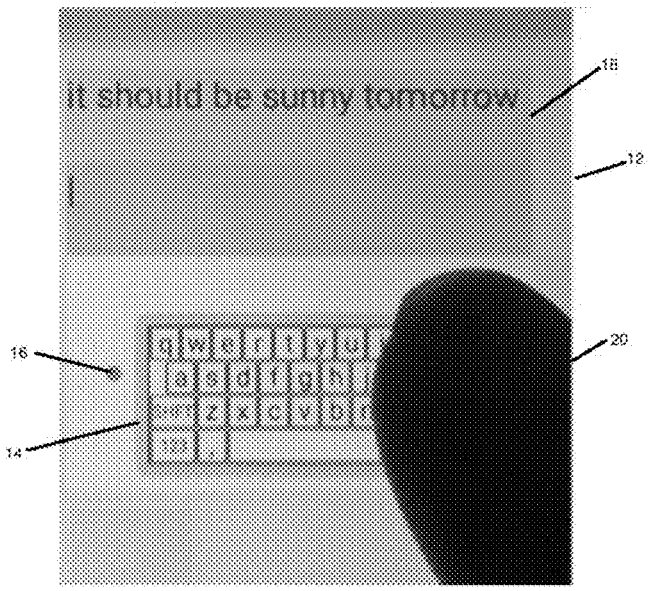
FIG. 2-5 shows the virtual keyboard in FIG. 1 being used to enter a letter.

The process begins with the user placing a finger 20 on the keyboard 14 as shown in FIG. 2. There is no need to place the finger 20 at any particular location on the keyboard 14. Once the finger 20 is on the keyboard 14, the user can move the keyboard 14 by moving his finger 20.

In some implementations, there is no need to place a finger 20 on the keyboard 14. Instead, the finger 20 can be placed anywhere on the display 12.

Figure 3:
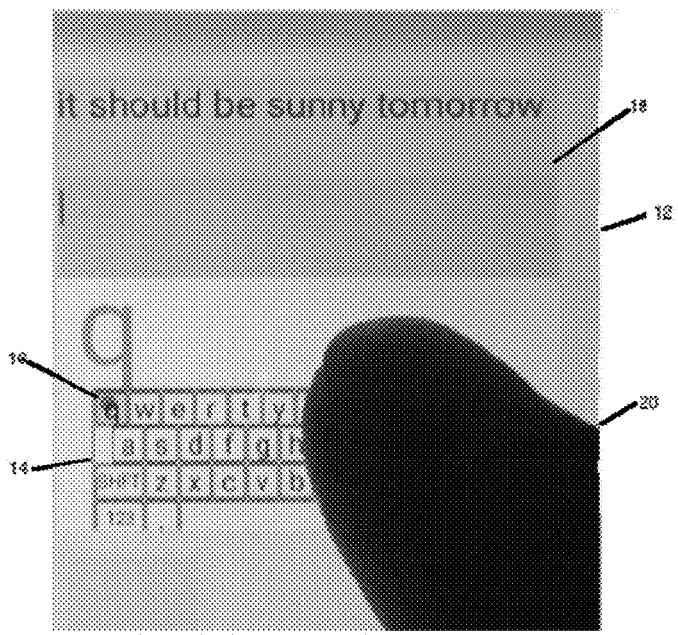

In order to type the letter "i," the user must execute the middle section of the tripartite gesture in such a way as to drag the keyboard 14 to the left so that the letter "i" appears under the fixed cursor 16. FIG. 3 shows the keyboard 14 at an instant during an interval during which it is being dragged to the left as a result of a user having initiated execution of a middle section of the tripartite gesture. At the instant captured in FIG. 3, the letter "q" happens to be under the fixed cursor 16. If, at the particular instant shown in FIG. 3, the user were to terminate the middle section of the tripartite gesture and begin the ending section of the tripartite gesture, for example by lifting his finger 20, the letter "q" would be typed in the text box 18. In some embodiments, a magnified version of whatever character is under the cursor 16 appears on the display adjacent to the cursor 16. This assists the user in determining whether the proper letter has been selected, in which case it would be appropriate to execute the ending section of the tripartite gesture.

Figure 4:
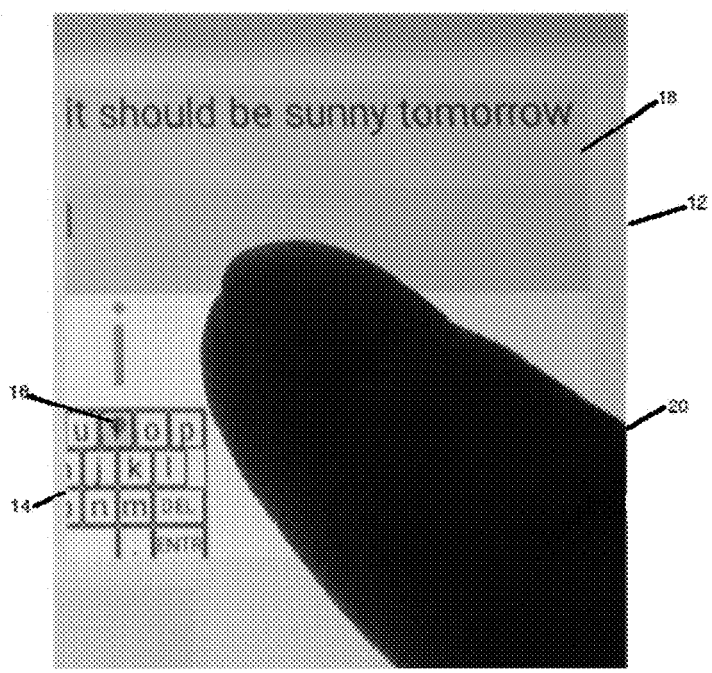
Figure 5:
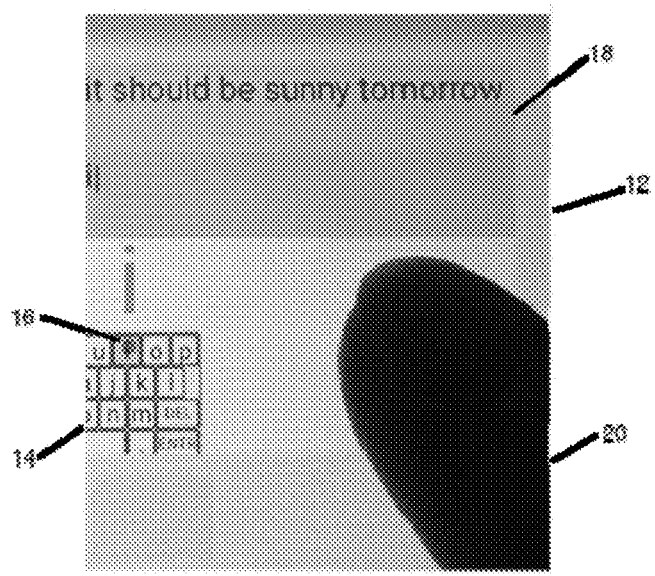

The user continues to execute the middle section of the tripartite gesture by moving his finger 20 to the left. This causes the keyboard 14 to also move to the left until eventually, the letter "i" appears under the fixed cursor 16, as shown in FIG. 4. Once the letter "i" is under the fixed cursor 16, the user lifts his finger off the keyboard 14, thus ending the tripartite gesture. This causes the letter "i" to appear in the text box 18, as shown in FIG. 5.

In some embodiments, the empty space around the visible frame of the keyboard 14 defines a space key. This is particularly convenient because a space key is so commonly used in text. In such cases, one inserts a space by executing the same tripartite gesture, but with empty space under the cursor 16 when the third part of the gesture is carried out.

In some embodiments, the keys 17 are adjacent to each other. This results in a smaller keyboard 14. However, it is sometimes easier to correctly position a key 17 under the fixed cursor 16 when dead space surrounds each key 17.

Figure 6:
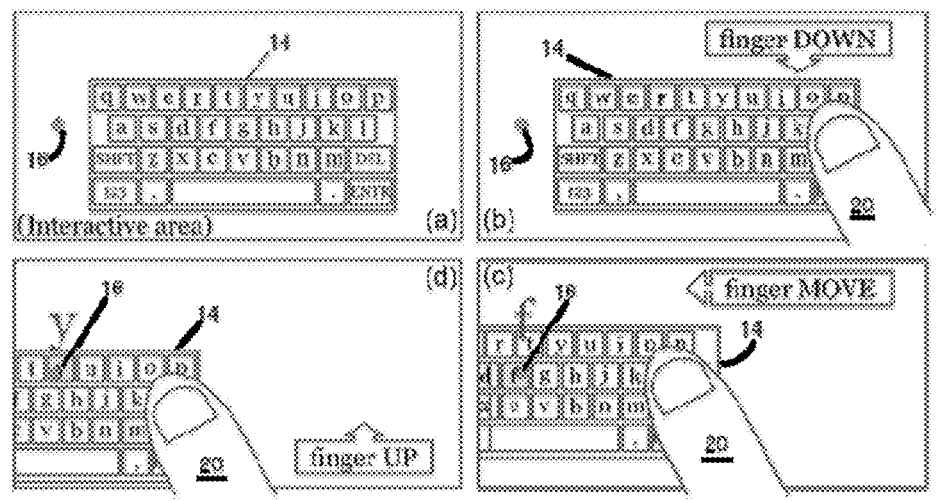
FIG. 6 shows a keyboard having a portion that becomes invisible during a gesture.

FIG. 6's frame (a) shows a keyboard 14 that is initially visible in its entirety. In frame (b), a finger 20 touches the display 12, thus unmooring the keyboard 14 so that the letter "y" can ultimately be placed at the fixed cursor 16. As shown in frame (c), once the finger 20 moves far enough to the left, a portion of the keyboard 14 disappears. Finally, at frame (d), with the "y" now under the fixed cursor 16, the finger 20 lifts off, thus causing the "y" to be selected and typed. During the operation shown in frames (a)-(d) of FIG. 6, the keyboard 14 undergoes a transition between a first state and a second state. In the first state, the keyboard 14 is fully visible. In the second state, the keyboard 14 has a visible portion and an invisible portion.

In the embodiment shown, the display 12 is large enough so that the entire keyboard 14 can be made visible at one time. In contrast, FIG. 7 shows a display 12 that is too small for a keyboard 14 to fit entirely into at one time.

Immediately prior to a gesture, the keyboard 14 can be viewed as being divided into first and second zones, each of which contains a subset of the keys. The user's gesture, and in particular, the second part of the tripartite gesture, causes these zones to change state.

Figure 7:
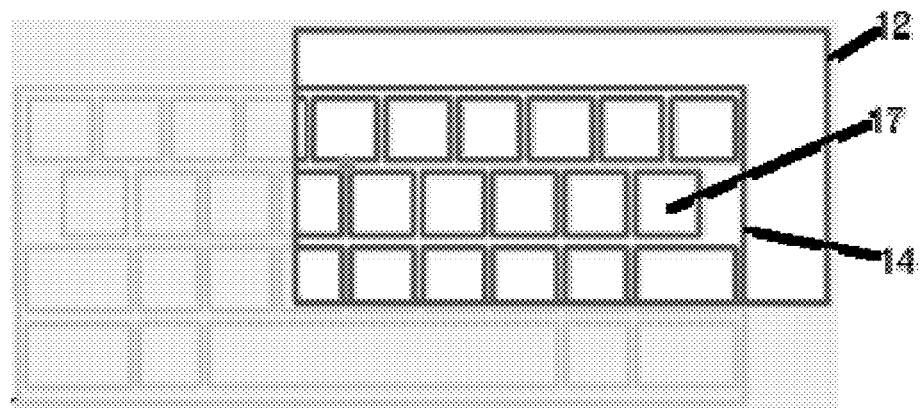
FIG. 7 shows what happens to the invisible portion of the keyboard in FIG. 6.

FIG. 7 shows the first zone of the keyboard 14 in a first state. In this first state, the first zone lies fully inside the display 12. Executing the second part of the tripartite gesture causes the first zone to transition into a second state. In the second state, a portion of the first zone moves outside of the display 12. Thus, in its second state, at least a portion of the first zone is invisible. Since the second part of the gesture is continuous, there is a corresponding continuum of second states. Thus, in effect, the first zone transitions continuously from a first state to any one of a continuum of second states during the course of the second part of the tripartite gesture.

FIG. 7 also shows the second zone in a first state. In this first state, the second zone is fully outside the display 12 and therefore completely invisible. The second part of the tripartite gesture causes this second zone to transition into a second state in which some of it moves inside the display 12. In its second state, at least a portion of this second zone is therefore rendered visible.

In the case in which the display is large enough relative to the keyboard 14, not every execution of a second part will cause a state transition as described in connection with FIG. 7. In those cases in which the display is smaller than the keyboard 14, every second part will cause both state transitions. And in intermediate cases, it is possible for the user to execute a gesture in such a way as to cause one state transition and not the other.

As described thus far, the keyboard 14 exactly tracks the user's movement. Thus, if the user moves his finger 20 by a quarter inch in a particular direction, the keyboard 14 moves by a quarter inch in the same direction. Stated more generally, if a finger 20 experiences a displacement of $\Delta r$, where r is a two-dimensional vector, the keyboard 14 undergoes a displacement of $\Delta r$ as well.

However, it is also possible for a keyboard 14 to respond to a displacement of $\Delta r$ by undergoing a displacement of $A \cdot \Delta r$, where A is a scalar value that reflects the gain of the movement.

The availability of a gain, A, is useful for cases in which, because of the placement of the keyboard 14 relative to the display 12, there are keys on the keyboard 14 that cannot be placed under the fixed cursor 16 given the size constraint of the display 12 if A=1. In that case, it would be useful to set A>1.

Alternatively, if the user has difficulty with precision of movement, it may be useful to set A<1. This setting would be useful in those cases in which a user has poor hand-eye coordination or motor function.

Alternatively, it may be useful for A to be a function of where the user initially places his finger 20 on the display 12. For example, if the user places his finger 20 near the edge of the display 12, it may be wise to make A larger to ensure that the keyboard 14 will slide far enough so that each key 17 can be still be placed under the fixed cursor 16. In that case, A=f(x, y), where x and y are the display coordinates at which a user's finger 20 lands when beginning a gesture.

Alternatively, it may be useful for A to be a function of where the geometric relationship between the keyboard 14 and the display 12 at the time the user initially places his finger 20 on the display 12. In such cases, if most of the keyboard 14 happens to be outside of the display 12, then A may be set higher.

In some cases, it may be desirable to provide something analogous to momentum. For example, in some embodiments, a rapid execution of the middle section yields a greater keyboard displacement than a slower execution of the middle section. In that case, the relationship between the keyboard's displacement and the finger's displacement could be governed by a suitable differential equation.

Figure 8:
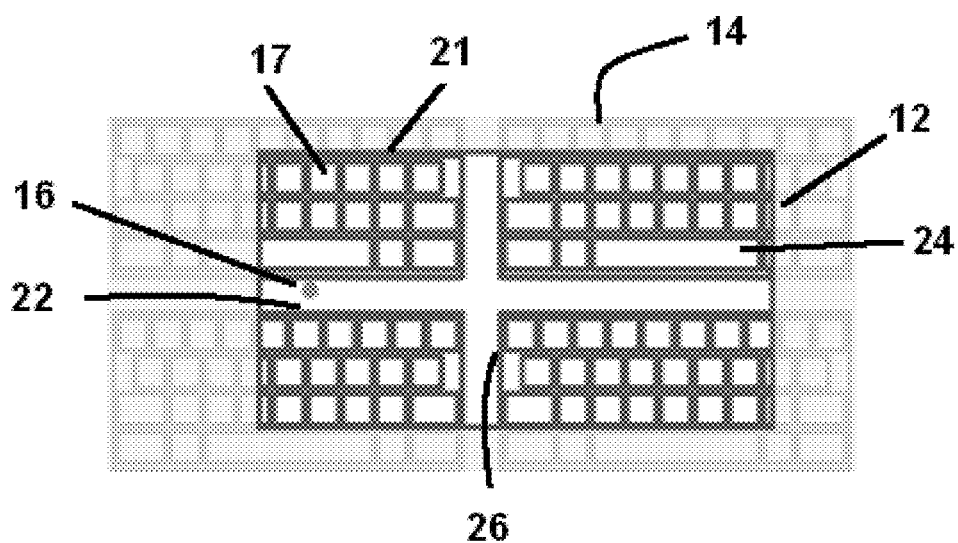
FIG. 8 shows an embodiment with a keyboard having multiple key sets.

In the embodiments described thus far, the keyboard 14 has only a single key set such as a QWERTY keyset. However, is some applications, the user may wish to type keys from different key sets. For example, it may be desirable to provide an emoji key set, or it may be desirable to provide a math key set or one with Greek or Cyrillic letters. FIG. 8 shows an embodiment in which the keyboard 14 has four key sets 21, 22, 24, 26 that all move together in response to a user gesture.

Figure 9:
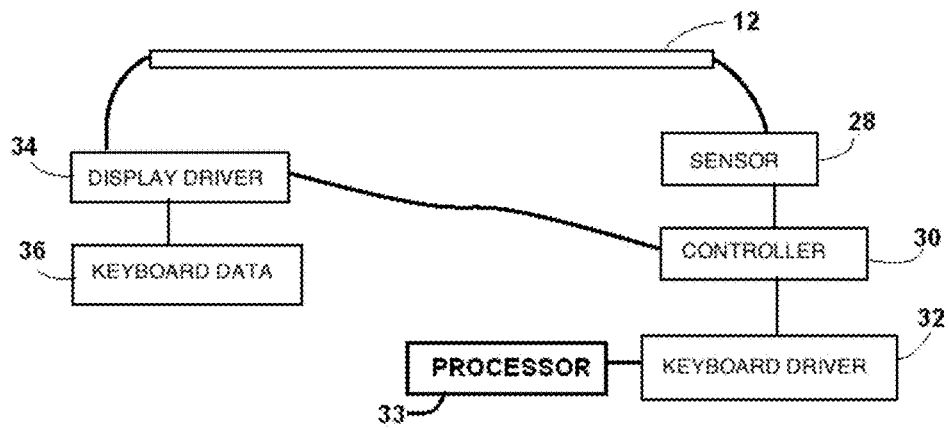
FIG. 9 shows architecture for implementing the keyboard of FIG. 1.

FIG. 9 shows an exemplary architecture for implementing the keyboard 14. The architecture includes a sensor 28 that receives a signal indicative of a finger's location on the display 12 and translates this into data suitable for use by a controller 30. The controller 30 transforms this data based on any stored gain value and provides instructions to a display driver 34. In addition, the controller 30 identifies what key 17, if any, is at the fixed cursor 16. In response to the instructions, the display driver 34 retrieves relevant keyboard data 36 to be shown on the display 12. Upon detection of a user's finger 20 being removed from the display 12, the controller 30 provides information identifying the key 17 at the fixed cursor 16 to a keyboard driver 32 in communication with a processor 33.

Instructions for causing a processor to implement the architecture shown in FIG. 9 can be stored on an article of manufacture that includes a computer-readable medium. The computer-readable medium is made of matter that is tangible and non-transitory. Obviously, the act of placing instructions on matter cannot be carried out without transforming the matter in some way. Thus, an article of manufacture that has had instructions encoded thereon is necessarily transformed in the process.

Figure 10:
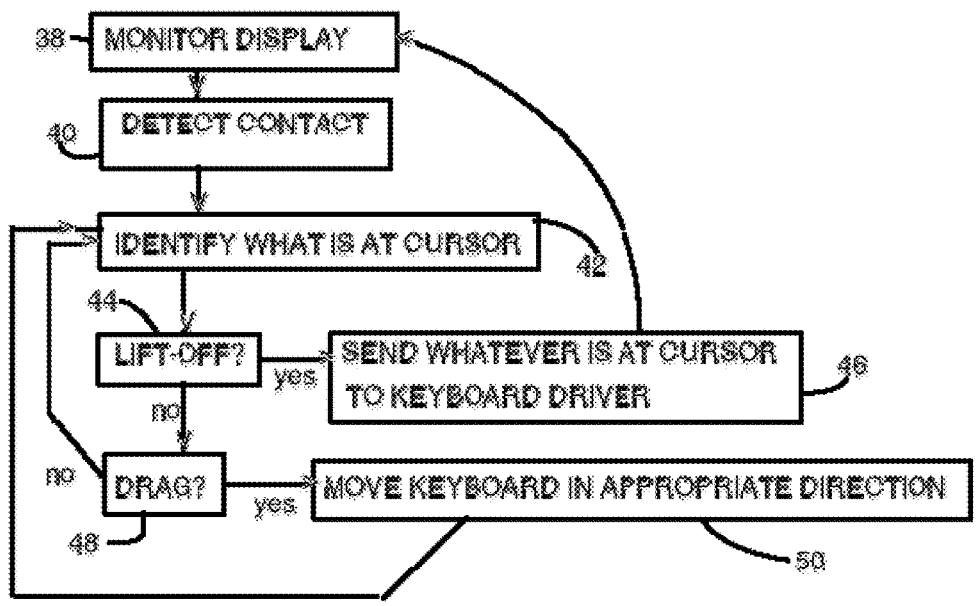
FIG. 10 shows a flow chart for a method carried out by the processor shown in FIG. 9.

FIG. 10 shows an algorithm used for execution by the controller shown in FIG. 9. The procedure begins with monitoring the display for any activity (step 38). Upon detecting a finger in contact with the display (step 40), the identity of whatever is at the cursor is detected (step 42). This might be an actual character or empty space. If the controller detects a lift off, or removal of the finger from the display (step 44), it causes whatever is at the cursor controller to be sent to the keyboard driver (step 46). Then, it returns to monitoring the display (step 38). If there is no lift-off, the controller checks to see if a execution of a middle section of the tripartite gesture has occurred (step 48). If so, the keyboard is moved in a direction and by an amount that is consistent with the middle section of the tripartite gesture (step 50). Otherwise, the controller goes back and identifies what is at the cursor (step 46) and awaits a lift-off (step 44).

Having described the invention, and a preferred embodiment thereof, what we claim as new, and secured by letters patent is:

1. A manufacture comprising a tangible and non-transitory computer-readable medium having encoded thereon instructions for causing a device to execute software comprising a set of instructions for enabling a user to make a selection from a virtual keyboard that is shown on a display, wherein said display is a touch-screen display, wherein said set of instructions comprises:
   instructions for defining said virtual keyboard,
      wherein said virtual keyboard comprises keys, each of which corresponds to a character from a character set,
      wherein said virtual keyboard comprises a first zone and a second zone,
      wherein said first zone comprises a first subset of said keys, and
      wherein said second zone comprises a second subset of said keys,
   instructions for causing relative motion between said virtual keyboard and said display in response to a gesture by a user on said display,
      wherein said gesture begins with a beginning, ends with an ending, and consists of a middle section between said beginning and said ending,
      wherein said middle section ends upon occurrence of said ending,
      wherein during said middle section, a user contacts said display to trace a continuous path on said display,
      wherein during tracing of said continuous path, said user is continuously in contact with said display,
      wherein, during said middle section, said first zone transitions between a first state and a second state,
      wherein in said first state, said first zone is fully visible, and wherein in said second state, at least a portion of said first zone is rendered invisible,
   wherein said set of instructions further comprises
   instructions for displaying said first zone of said virtual keyboard,
   instructions for displaying a selection cursor at a fixed location on said display of said device, and
   instructions for responding to said user executing said middle section of said gesture by causing said first zone to transition from said first state to said second state,
   instructions for causing a first key from said virtual keyboard to move to said cursor as a result of said user having executed said middle section, wherein said first key corresponds to a first character, and
   instructions for generating data indicative of a selection of said first character by said user in response to detection of an ending of said gesture by said user.

2. The manufacture of claim 1, wherein said instructions for generating data indicative of said selection of said first character are carried out in response to detecting cessation of contact between said user and said display.

3. The manufacture of claim 1, wherein said first key is in said first zone.

4. The manufacture of claim 1, wherein said first key is in said second zone.

5. The manufacture of claim 1, wherein said display imposes on said path traced during said middle section of said gesture a maximum physical displacement, wherein said software further comprises instructions for responding to tracing of said path by causing relative motion between said display and said virtual keyboard to an extent that is sufficient to ensure that all keys on said virtual keyboard can be moved to said cursor within a swipe section that is less than or equal to said maximum physical displacement.

6. The manufacture of claim 5, wherein said software comprises instructions for determining said extent that is sufficient to ensure that all keys on said virtual keyboard can be moved to said cursor within a swipe section that is less than or equal to said maximum physical displacement that said display imposes on said path traced during said middle section of said gesture based on a location of a zone relative to said display, wherein said zone is selected from the group consisting of said first zone and said second zone, wherein, during said middle section, said first zone transitions between a first state, in which said first zone is fully visible, and a second state, in which at least a portion of said first zone is rendered invisible, and wherein said second zone is that portion of said keyboard that is not said first zone.

7. The manufacture of claim 1, wherein said instructions comprise instructions such that during said middle section, said second zone transitions between a first state and a second state, wherein in said first state, said second zone is fully invisible, and wherein in said second state, at least a portion of said second zone is rendered visible.

8. The manufacture of claim 1, further comprising instructions for enabling a user to set a position of said cursor on said display.

9. The manufacture of claim 1, wherein said instructions further comprise instructions for causing insertion of a space when a space is under said cursor upon occurrence of said ending.

10. The manufacture of claim 1, wherein said instructions for defining said virtual keyboard comprise instructions for defining a keyboard that is larger than said display.

11. The manufacture of claim 1, wherein said instructions for defining said virtual keyboard comprise instructions for defining a virtual keyboard having a plurality of keyboards that are separate from each other, wherein each keyboard in said plurality of keyboards has a different key set, wherein said keyboards move as a unit during said execution of said middle section.

12. The manufacture of claim 11, wherein at least one of said keyboards has a key set selected from the group consisting of an emoji key set, a math key set, a Greek key set, and a Cyrillic key set.

13. The manufacture of claim 1, wherein said instructions further comprise instructions for causing insertion of a space when empty space that surrounds said keyboard is under said cursor upon occurrence of said ending.

14. The manufacture of claim 1, further comprising instructions that cause a character that is present at said selection cursor to be captured and placed in a text box together with other characters that have been captured at said selection cursor.

15. The manufacture of claim 1, wherein said keys on said virtual keyboard are surrounded by a dead space.

16. The manufacture of claim 1, wherein said virtual keyboard fails to exactly track a movement by said user while tracing said continuous path.

17. The manufacture of claim 1, further comprising instructions for causing said virtual keyboard to move by a first distance when said user moves by a second distance during a middle section of a first gesture and for causing said virtual keyboard to move by a third distance when said user moves by a fourth distance during a middle section of a second gesture, wherein said second and fourth distances are equal and wherein said first and third distances are different.

18. The manufacture of claim 1, wherein said virtual keyboard exactly tracks movement by said user while tracing said continuous path.

19. The manufacture of claim 1, wherein said virtual keyboard displaces with momentum in response to movement by said user while tracing said continuous path.

* * * * *